Patented Nov. 8, 1938

2,136,136

UNITED STATES PATENT OFFICE 2,136,136

DYESTUFFS

Hans Johner and Gérald Bonhôte, Basel, Switzerland, assignors to the firm Society of Chemical Industry in Basle, Basel, Switzerland No Drawing. Original application July 12, 1937, Serial No. 153,279. Divided and this application January 10, 1938, Serial No. 184,277. In Switzerland July 14, 1936

8 Claims. (Cl. 260—308)

This application is a division of our application Serial No. 153,279, filed in U. S. A. on July 12, 1937 and in Switzerland on July 14, 1936.

The present invention relates to new arylides of β-ketone-carboxylic acids which are valuable intermediate products for the manufacture of dyestuffs. It comprises the new arylides, the process of producing the same as well as their application for the manufacture of dyestuffs.

It has been found that valuable arylides of β-ketone-carboxylic acids may be obtained if amino compounds of the general formula

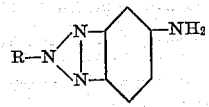

in which R stands for an aryl radical of the benzene or naphthalene series such as the 5-amino-2-phenyl-pseudo-azimidobenzene, the 5-amino-6-methyl-2-phenyl-pseudo-azimidobenzene, the 5-amino-2 - (4'-methoxy) - phenyl-pseudo-azimidobenzene, the 5-amino-2-(4'-ethoxy)-phenyl-pseudo-azimidobenzene, the 5-amino-6-methyl-2-(4'-methoxy) - phenyl-pseudo-azimidobenzene, the 5-amino - 6 - methyl-2 - (4'-ethoxy) - phenyl-pseudo-azimidobenzene, the 5-amino-6-methoxy-2-(4' - methoxy)-phenyl-pseudo-azimidobenzene, the 5-amino-6 - methoxy-2-(4' - ethoxy) -phenyl-pseudo-azimidobenzene, the 5-amino-2-(1')-naphthyl-pseudo-azimidobenzene, the 5-amino-2-(4'- β-methoxy-oxy-ethyl)-phenyl-pseudo-azimidobenzene, are condensed with esters of β-ketone-carboxylic acids, such as ethyl acetoacetate, benzoyl acetic ester, or terephthaloyl acetic ester.

These arylides thus correspond to the general formula

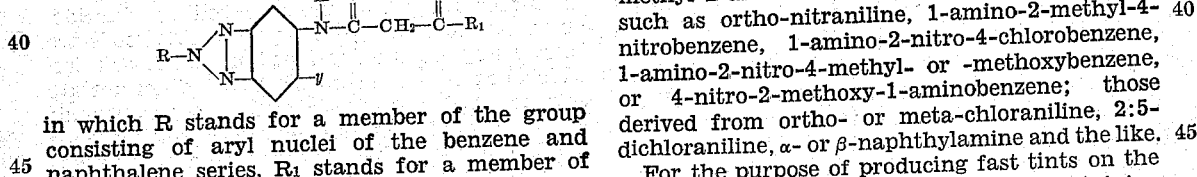

in which R stands for a member of the group consisting of aryl nuclei of the benzene and naphthalene series, R₁ stands for a member of the group constisting of methyl and phenyl, and y stands for a member of the group consisting of H, CH₃ and O-alkyl. Among such products those are valuable in which R represents a nucleus of the benzene series because they lead to particularly valuable dyestuffs. Among such products those are again particularly valuable which correspond to the general formula

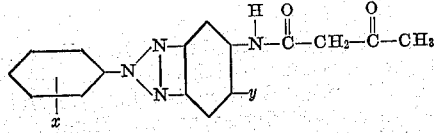

in which y has the signification already indicated above and x stands for a member of the group consisting of H, CH₃ and O-alkyl. All these products are light colored powders insoluble in water but soluble in aqueous caustic alkalies.

The new arylides, which represent valuable intermediate products for the manufacture of dyestuffs, dissolve in aqueous caustic alkalies owing to the presence of the —CO—CH₂—CO— group. In such solutions the alkali salts of the new arylides possess a marked affinity for the vegetable fiber, which is entirely surprising, since the similar arylides from the isomeric amino-azimides do not possess such an affinity for the vegetable fiber. Since they combine with diazo compounds to azo-dyestuffs they are inter alia very suitable for the production of azo-dyestuffs on the vegetable fiber (cotton, ramie, flax, jute and the like) as well as on regenerated cellulose (viscose or cuprammonium silk), and also on animal fibers such as wool, natural silk or loaded silk, according to the methods usual in dyeing with ice colors. Such methods are, for example, padding the fiber in an alkaline solution of the new arylide and developing with a diazo compound, preferably one containing no hydroxy-, carboxy- or sulfo-groups. Such diazo-compounds are, for instance, those derived from aniline, ethers or esters of amino-phenols, for example ortho- or para-anisidine, 4-chloro-2-amino-diphenylether, 4:4'-dichloro-2-aminodiphenylether; those derived from monoacylated products from 2:5-diamino-hydroquinone-diethyl- or -dimethylether and benzoylchloride or phenoxy-acetic-acid-chloride; aminoazo-dyestuffs, for instance, 4-amino-5-methoxyazobenzene, 4-amino-2:5-dimethoxyazo-benzene, ortho-amino-azo-toluene; further those derived from chlorotoluidines, for instance 4-chloro-2-methyl-1 - aminobenzene, 4-chloro-1-methyl-2-aminobenzene; those from nitralines such as ortho-nitraniline, 1-amino-2-methyl-4-nitrobenzene, 1-amino-2-nitro-4-chlorobenzene, 1-amino-2-nitro-4-methyl- or -methoxybenzene, or 4-nitro-2-methoxy-1-aminobenzene; those derived from ortho- or meta-chloraniline, 2:5-dichloraniline, α- or β-naphthylamine and the like.

For the purpose of producing fast tints on the fiber preparations or printing colors containing them may also be prepared which contain an alkali salt of the new derivatives and a stabilized diazo-compound in the form of a nitrosamine or of a diazoamino-compound. These preparations may be printed on the fiber and then developed to dyestuffs by suitable treatment, for example by passage through an acid. It is also possible to print mixtures of the free diazotizing components or the corresponding N-nitramines and alkali salts of the new coupling components on the fiber and to convert such mixture into dyestuffs by development with nitrous acid, and, if desired, subsequent treatment in alkali.

The condensation product of the general formula

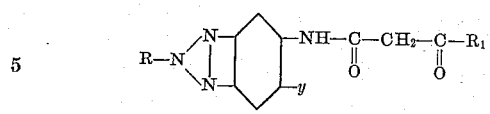

in which R, R₁ and y have the signification indicated above, coupled in substance with the same non-sulfonated compounds with which they are used for the production of fast tints on the fiber, yield pigments which are useful as such or in coloring lacquers, varnishes or the like.

With sulfonated diazo-compounds wool dyestuffs are in particular obtained. Especially valuable are the dyestuffs which are derived from ortho-hydroxylated or ortho-carboxylated diazo-compounds as these products may be converted in substance or on the fiber into metalliferous dyestuffs.

The dyestuffs which may be prepared according to the present process with aid of the new arylides correspond therefore to the general formula

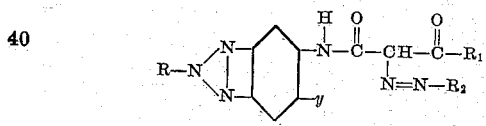

in which R, R₁ and y have the signification indicated above, and R₂ stands for an aromatic radical selected from the group consisting of aromatic nuclei of the benzene and naphthalene series. If these dyestuffs do not contain sulfogroups they represent yellow to orange or brown-orange pigments which are insoluble in water. Particularly valuable are the dyestuffs of the formula

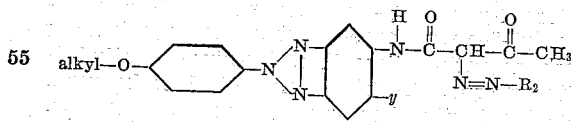

in which R₂ stands for an aromatic radical of the benzene series, if the benzene radical R₂ contains a nitro-group in ortho-position to the —N=N— group. These dyestuffs when produced on the fiber dye the same yellow tints of very good fastness properties, particularly excellent fastness to light.

The following examples illustrate the invention, the parts being by weight:—

*Example 1*

21 parts of 5-amino-2-phenyl-pseudo-azimido-benzene are introduced into 200 parts of chlorobenzene, a few drops of diethylaniline are added and the whole is heated to boiling under reflux. The chlorobenzene is then distilled and there are added gradually 15 parts of ethylacetoacetate. Condensation is continued for 2 hours, during which time the alcohol formed and some chlorobenzene are distilled. When condensation is complete, the mass is cooled, the chlorobenzene is distilled in steam and the condensation product left behind is filtered; it is dissolved in dilute caustic alkali lye and, after filtration from some impurities, the solution is treated with dilute hydrochloric acid to reprecipitate the condensation product.

It is a white powder freely soluble in dilute alkalies and melting after recrystallization from alcohol at 152° C.

The process is similar with the other pseudo-azimides and β-ketone-carboxylic acid esters cited in the introductory paragraphs. The following table shows the melting point of some of such condensation products:—

| β-ketone-carboxylic-acid-ester | Azimide | Melting point from— |
|---|---|---|
| Ethyl acetoacetate | +5-amino-2-(4′-methoxy)-phenyl-pseudo-azimido-benzene | Alcohol 163° C. |
| Do | +5-amino-2-(4′-ethoxy)-phenyl-pseudo-azimido-benzene | Alcohol 191° C. |
| Do | +5-amino-6-methyl-2-phenyl-pseudo-azimido-benzene | Alcohol 205° C. |
| Do | +5-amino-6-methyl-2-(4′-methoxy)-phenyl-pseudo-azimidobenzene | Chloro-benzene 222° C. |
| Do | +5-amino-6-methoxy-2-(4′-methoxy)-phenyl-pseudo-azimidobenzene | Alcohol 168° C. |
| Do | +5-amino-6-methoxy-2-(4′-ethoxy)-phenyl-pseudo-azimidobenzene | Alcohol 155° C. |
| Do | +5-amino-6-chloro-2-phenyl-pseudo-azimidobenzene | Alcohol 185° C. |
| Do | +5-amino-6-methyl-2-(1′)-naphthyl-pseudo-azimidobenzene | Chloro-benzene 209° C. |
| Benzoyl acetic ester | +5-amino-2-phenyl-pseudo-azimidobenzene | Alcohol 180° C. |
| Terephthaloyl-di-acetic ester | do | Alcohol 280° C. |

*Example 2*

13.8 parts of ortho-nitraniline are diazotized as usual and the product is introduced into a solution of 29.4 parts of the condensation product from 5-amino-2-phenyl-pseudo-azimidobenzene and ethylacetoacetate, 100 parts of sodium hydroxide solution of 36° Bé, 15 parts sodium acetate and 2000 parts of water. The yellow dyestuff formed is precipitated immediately; it is filtered and dried.

If a sulfonic acid, for instance sulfanilic acid, is substituted for the ortho-nitraniline, there is obtained a dyestuff soluble in water.

*Example 3*

Cotton yarn is impregnated with a grounding prepared by dissolving 3 parts of the condensation product from 5-aminophenyl-pseudo-azimidobenzene and ethylacetoacetate in 300 parts of hot water with the addition of 6 parts sodium hydroxide solution of 30 per cent. strength, 10 parts of Turkey red oil, 15 parts of sodium chloride, and water to make up 1000 parts. The goods are then wrung out and developed in a diazo-solution which has been neutralized with sodium acetate and acidified with acetic acid, and corresponds with 2 parts of 1-amino-2-methyl-4-nitrobenzene per 1000 parts. There is produced a pure greenish-yellow of very good properties of fastness.

The formula of the new dyestuff is:

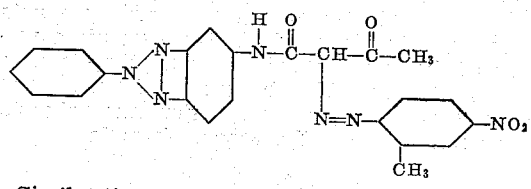

Similar tints are obtained with other diazo-components, for instance 1-amino-2-methyl-4-chlorobenzene, 1-amino-2-nitro-4-chlorobenzene, 1-amino-2-nitro-4-methylbenzene. Redder tints are obtained for instance with 1-amino-2-nitro- 4-methoxybenzene or ortho-aminoazotoluene. The formula of the latter new dyestuff is:—

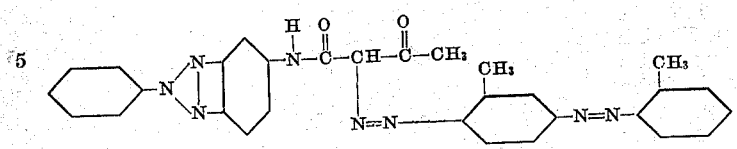

The goods may also be grounded at a raised temperature, for instance at 80° C.; such arylides may also be used for printing.

The following table comprises a number of other dyeing colors which may be made by this invention:—

| Diazo-component | Condensation product from ethyl aceto acetate with— | Color |
|---|---|---|
| 1. Ortho-nitraniline | 5-amino-2-(4'-methoxy)-phenyl-pseudo-azimidobenzene | Yellow. |
| 2. 1-amino-2-nitro-4-methyl-benzene | ......do...... | Do. |
| 3. 1-amino-2-nitro-4-methoxybenzene | ......do...... | Do. |
| 4. Ortho-nitraniline | 5-amino-2-(4'-ethoxy)-phenyl-pseudo-azimidobenzene | Do. |
| 5. Para-nitraniline | ......do...... | Greenish-yellow. |
| 6. 1-amino-2-nitro-4-methoxybenzene | ......do...... | Reddish-yellow. |
| 7. Ortho-aminoazo-toluene | 5-amino-6-methyl-2-phenyl-pseudo-azimidobenzene | Gold-orange. |
| 8. 1-amino-2-nitro-4-chlorbenzene | 5-amino-6-methyl-2-(4'-methoxy)-phenyl-pseudo-azimidobenzene | Reddish-yellow. |
| 9. 2:5-dichloraniline | 5-amino-6-methoxy-2-(4'-methoxy)-phenyl-pseudo-azimidobenzene | Yellow. |
| 10. 4:4'-dichlor-2-aminodiphenylether | ......do...... | Greenish-yellow. |
| 11. 1-amino-2-nitro-4-chlorbenzene | ......do...... | Reddish-yellow. |
| 12. Ortho-nitraniline | ......do...... | Yellow. |

The dyestuffs Nos. 1, 3, 6 and 9 of the foregoing table correspond to the following formulas:—

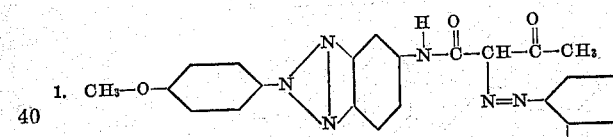

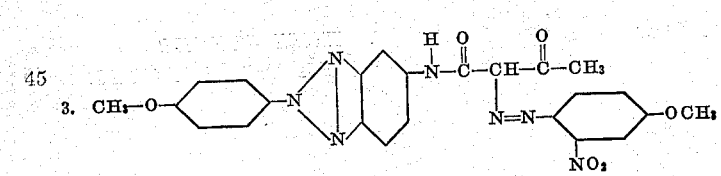

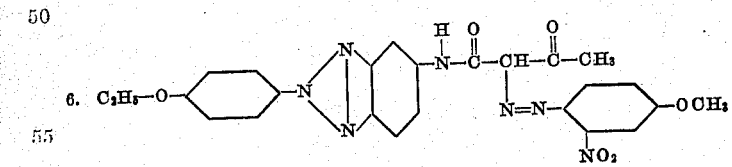

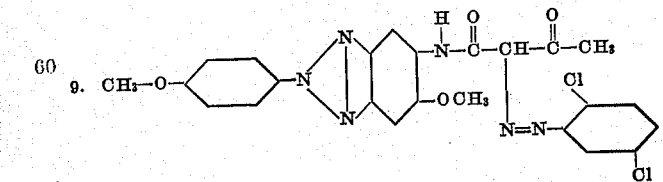

What we claim is:—
1. As new products the dyestuffs of the general formula

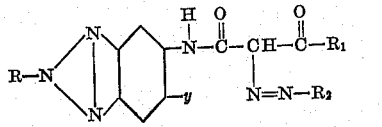

in which R stands for a member of the group consisting of nuclei of the benzene and naphthalene series, $R_1$ stands for a member of the group consisting of methyl and phenyl, $y$ stands for a member of the group consisting of H, $CH_3$ and O-alkyl, and $R_2$ stands for an aromatic radical of the group consisting of nuclei of the benzene and naphthalene series, which products are yellow to orange powders dyeing the fiber yellow to orange tints.

2. As new products the unsulfonated dyestuffs of the general formula

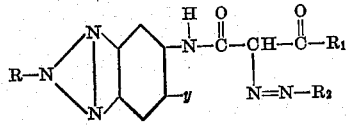

in which R stands for a member of the group consisting of nuclei of the benzene and naphthalene series, $R_1$ stands for a member of the group consisting of methyl and phenyl, $y$ stands for a member of the group consisting of H, $CH_3$ and O-alkyl, and $R_2$ stands for an aromatic radical of the group consisting of nuclei of the benzene and naphthalene series, which products are yellow to orange powders dyeing the fiber yellow to orange tints.

3. As new products the unsulfonated dyestuffs of the general formula

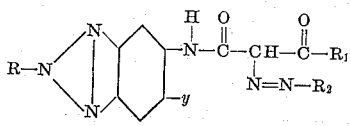

in which R stands for a nucleus of the benzene series, $R_1$ stands for a member of the group consisting of methyl and phenyl, $y$ stands for a member of the group consisting of H, $CH_3$ and O-alkyl, and $R_2$ stands for a nucleus of the benzene series, which products are yellow to orange powders dyeing the fiber yellow to orange tints.

4. As new products the unsulfonated dyestuffs of the general formula

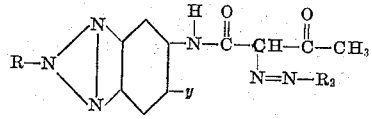

in which R stands for a nucleus of the benzene series, $y$ stands for a member of the group consisting of H, $CH_3$ and O-alkyl, and $R_2$ stands for a nucleus of the benzene series, which products are yellow to orange powders dyeing the fiber yellow to orange tints.

5. As new products the unsulfonated dyestuffs of the general formula

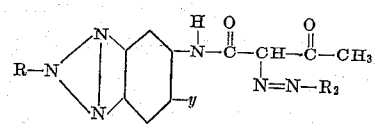

in which R stands for a nucleus of the benzene series, $y$ stands for a member of the group consisting of H, $CH_3$ and O-alkyl, and $R_2$ stands for a nucleus of the benzene series containing a nitro group, which products are yellow to orange powders, dyeing the fiber yellow to orange tints.

6. The dyestuff of the formula

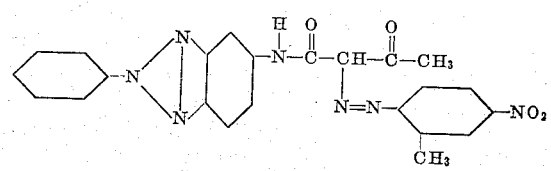

7. The dyestuff of the formula

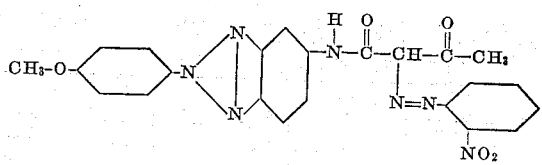

8. The dyestuff of the formula

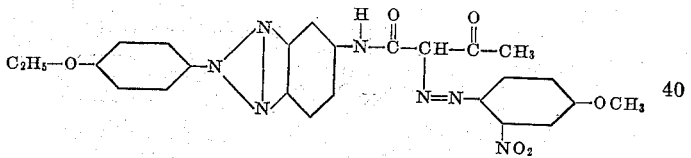

HANS JOHNER.
GÉRALD BONHÔTE.